(No Model.)  4 Sheets—Sheet 1.
T. A. BRIGGS.
MACHINE FOR MANUFACTURING TAGS, &c.
No. 251,347.  Patented Dec. 27, 1881.
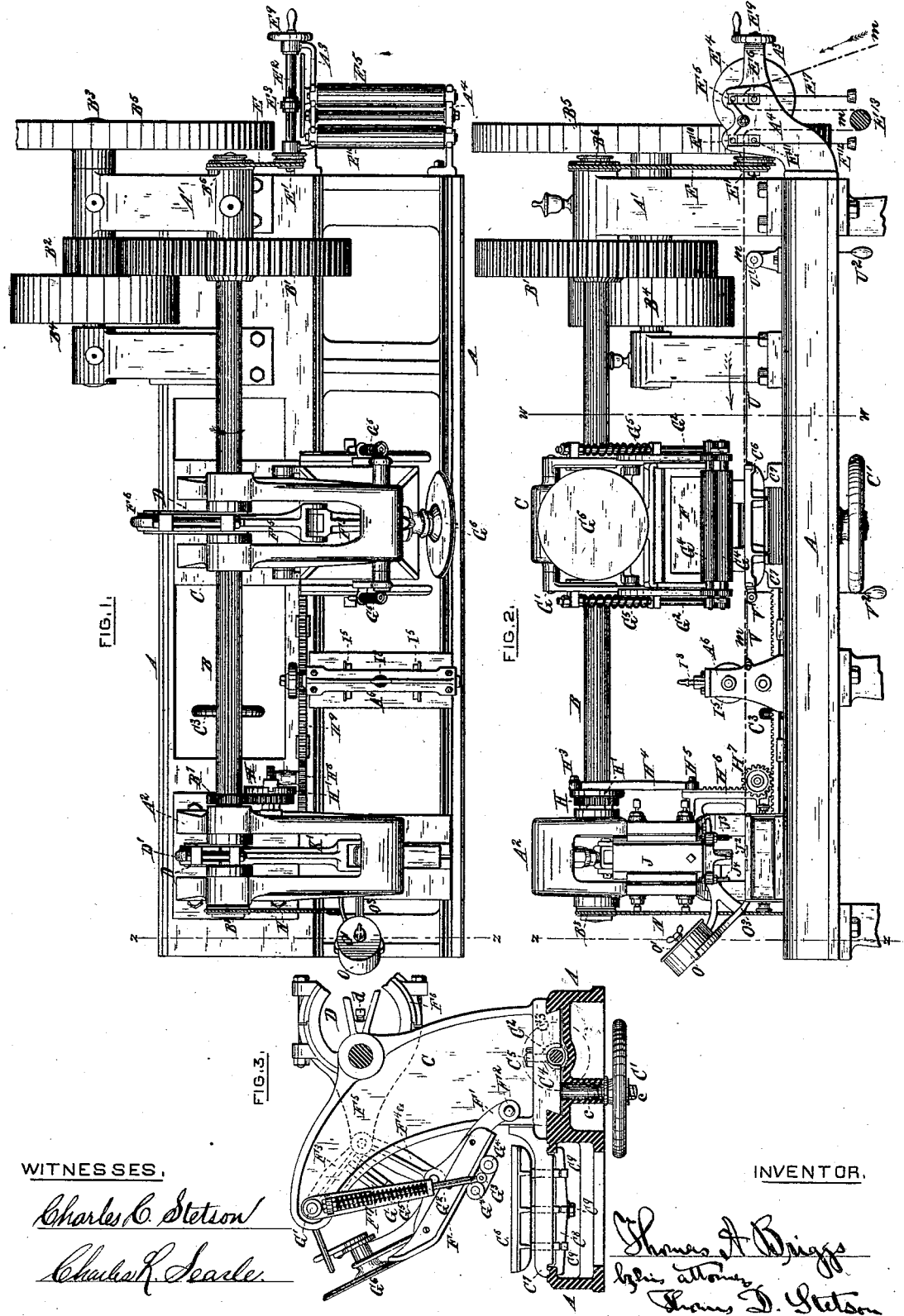
WITNESSES,
Charles C. Stetson
Charles R. Searle
INVENTOR,
Thomas A. Briggs
by his attorney
Thomas D. Stetson (No Model.)  4 Sheets—Sheet 2.
T. A. BRIGGS.
MACHINE FOR MANUFACTURING TAGS, &c.
No. 251,347.  Patented Dec. 27, 1881.
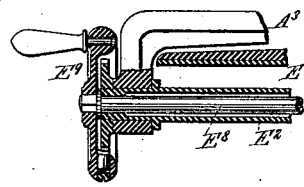
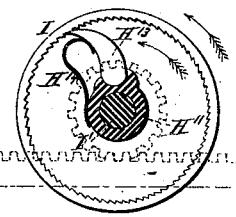
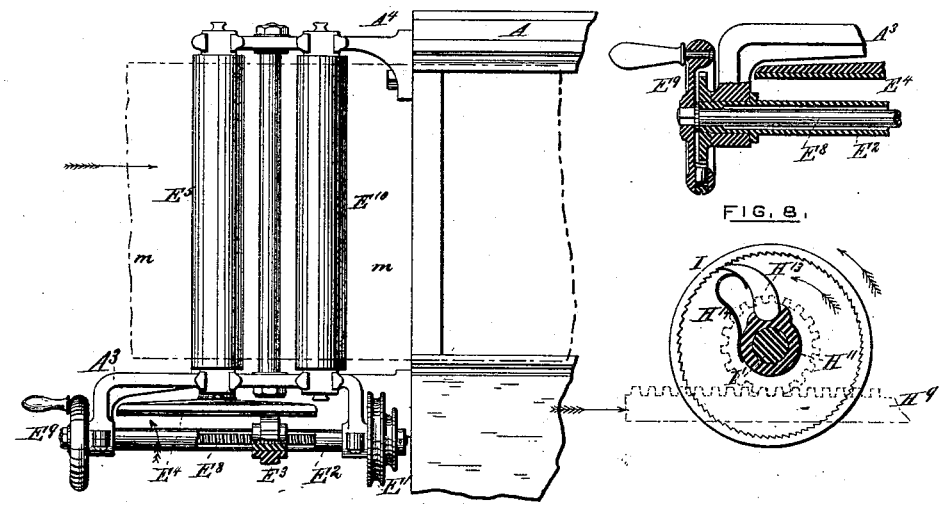
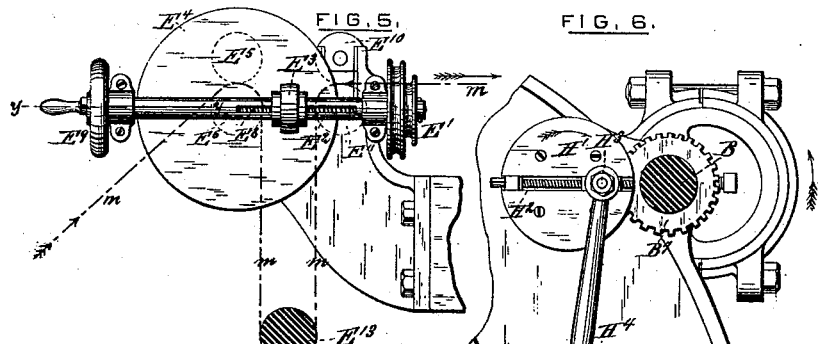
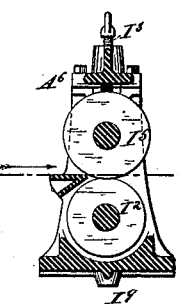
WITNESSES:
Charles C. Stetson
Charles R. Searle
INVENTOR,
Thomas A. Briggs
by his attorney
Thomas D. Stetson.

(No Model.) 4 Sheets—Sheet 3.
T. A. BRIGGS.
MACHINE FOR MANUFACTURING TAGS, &c.
No. 251,347. Patented Dec. 27, 1881.
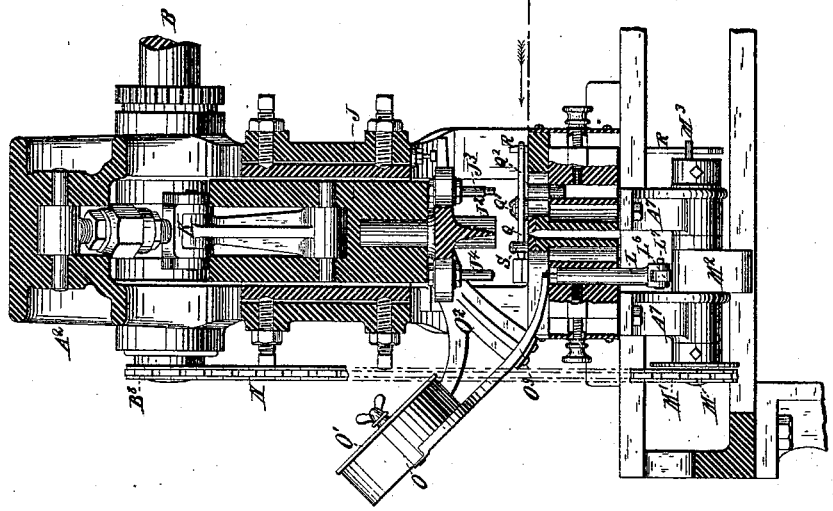
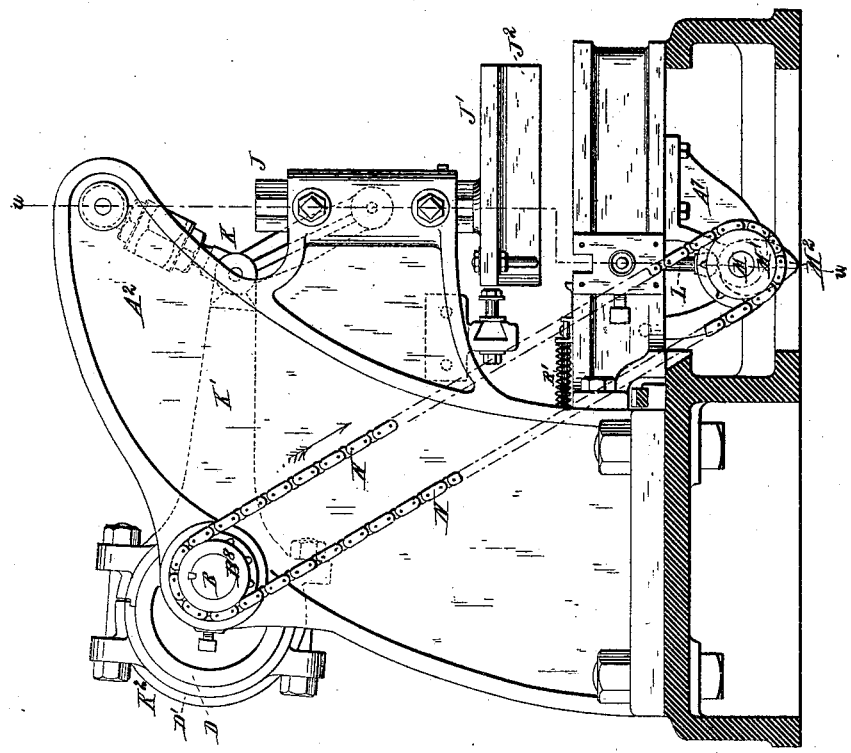
WITNESSES,
Charles C. Stetson
Charles R. Searle.
INVENTOR,
Thomas A. Briggs
by his attorney
Thomas D. Stetson

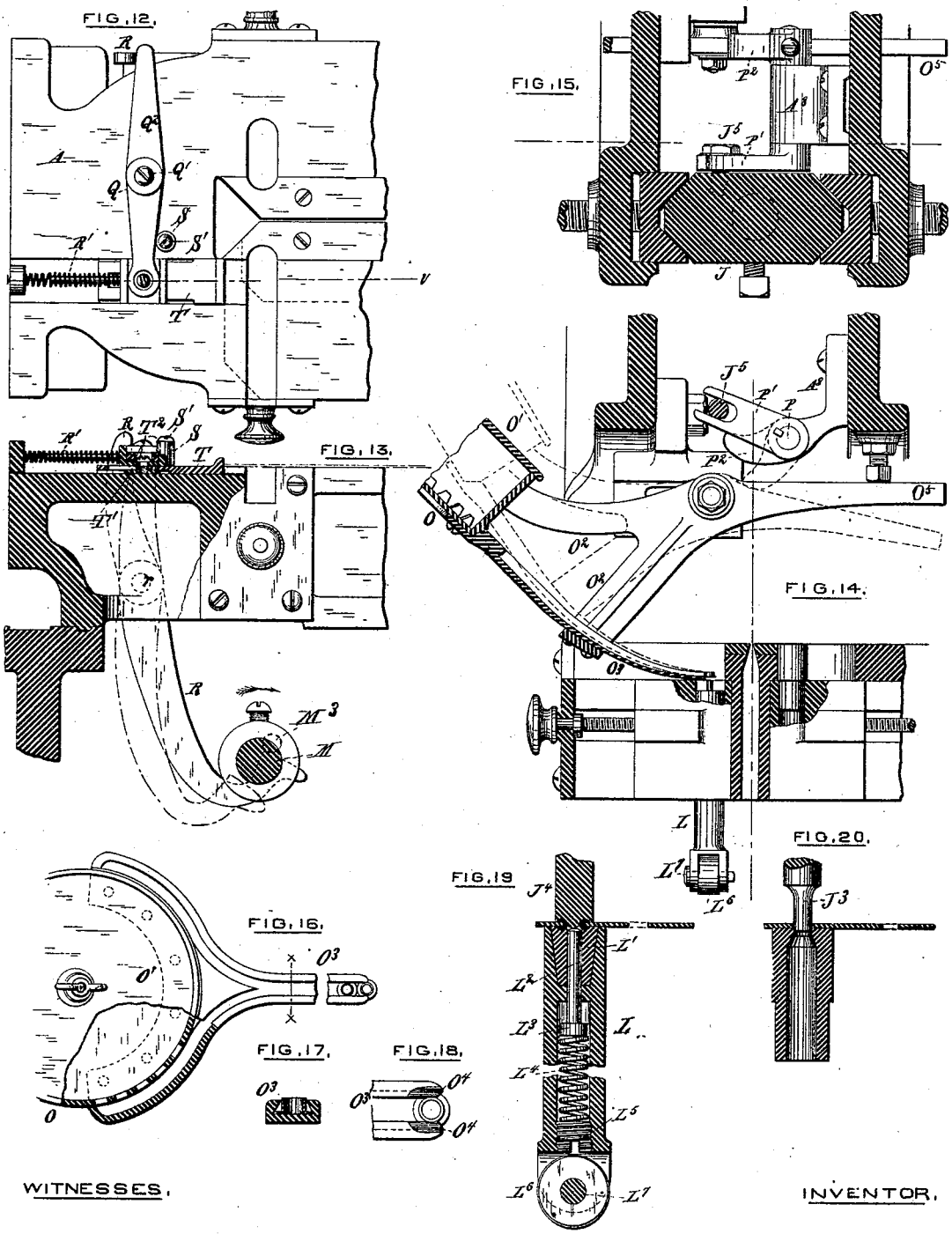

UNITED STATES PATENT OFFICE.

THOMAS A. BRIGGS, OF PROVIDENCE, RHODE ISLAND, ASSIGNOR TO HIMSELF, JOHN B. PERKINS, OF TAUNTON, MASSACHUSETTS, AND FRED. TALCOTT, OF ROCKVILLE, CONNECTICUT.

MACHINE FOR MANUFACTURING TAGS, &c.

SPECIFICATION forming part of Letters Patent No. 251,347, dated December 27, 1881.

Application filed September 25, 1880. (No model.)

*To all whom it may concern:*

Be it known that I, THOMAS A. BRIGGS, a citizen of the United States, residing in the city and county of Providence, in the State of Rhode Island, have invented certain new and useful Improemvents relating to Machines for Manufacturing Tags and Analogous Articles, of which the following is a specification.

The improved machine receives the paper or other material in a continuous length, feeds it intermittently through suitable printing mechanism, where it is printed, trims the edges if it is too wide, splits it into two or more portions if, as may be sometimes desirable, a number of small tags or tickets are to be produced at once from a sufficiently wide strip, and cuts off the proper lengths. If, as is required in many classes of tags, a hole is to be produced and eyeleted, this is effected by proper mechanism at the same operation.

The following is a description of what I consider the best means of carrying out the invention.

The accompanying drawings form a part of this specification.

Figure 1 is a plan or top view of the entire machine; Fig. 2, a front view, and Fig. 3 a transverse section on the line $w\ w$ in Fig. 2. The succeeding figures are on a larger scale. Fig. 4 is a plan view as seen from the rear side of the machine. Fig. 5 is an elevation of the same parts as seen from the rear. Fig. 6 is a transverse section through the bed, with a corresponding elevation of certain portions relating to the intermittent feeding mechanism. Fig. 7 is a section through the feed-rolls and their supporting-frame on the line $x\ x$ in Fig. 6. Figs. 8 and 9 are on a still larger scale. Fig. 8 shows the click or ratchet-wheel of the intermittent feeding device, with a portion of the rack in dotted lines. This is a front view. Fig. 9 is a horizontal section through a portion on the line $y\ y$ in Fig. 5. Fig. 10 is a transverse section through the machine on the line $z\ z$ in Figs. 1 and 2, with the eyelet-hopper removed. Fig. 11 is a section on the line $u\ u$ in Fig. 10. This figure shows the eyelet-hopper in place. The remaining figures are on a still larger scale. Fig. 12 is a plan view of the knock-off mechanism. Fig. 13 is a transverse section through a portion on the line $v\ v$, Fig. 12. Fig. 14 is a longitudinal section through certain portions in the plane of the eyelet-hopper. Fig. 15 is a horizontal section of a portion, showing the reciprocating knife and guides. Fig. 16 is a plan view, partly in section, showing the hopper detached. The succeeding figures are on a still larger scale. Fig. 17 is a cross-section on the line $x\ x$ in Fig. 16. Fig. 18 is a plan view of the end of the eyelet-track shown in Fig. 16. Fig. 19 is a vertical section through the parts for riveting or setting the eyelet. Fig. 20 is a vertical section through a portion, showing the action of the punch.

Similar letters of reference indicate like parts in all the figures.

A is a fixed frame-work, of cast-iron or other suitable material, certain portions of which will be further designated by additional marks, as $A'$, $A^2$, &c.

B is the main shaft, supported in a bearing in the pedestal $A'$ at one end, and in the stout press-frame $A^2$ near the other end, of the frame A. The shaft B is also supported or extends through a bearing in a stout casting, C, which may be shifted longitudinally of the frame within considerable limits. This main shaft B is turned strongly by means of a large gear-wheel, $B'$, which engages with a pinion, $B^2$, on a shaft, $B^3$, supported also in fixed bearings. The shaft $B^3$ receives motion through a belt (not represented) running on a pulley, $B^4$, and is provided with a fly-wheel, $B^5$.

The several members of the mechanism relating to the printing and the inking of the form are mounted and supported in the casting C. This casting is adjusted on the main framing A, and is firmly held in the required position by means of a threaded stud, $c$, and a nut working thereon in the form of a hand-wheel, $C'$.

$C^2$ is a screw extending longitudinally of the machine and turned by the hand-wheel $C^3$. It is tapped through a nut, $C^4$, held in a proper recess in the base of the casting C, and firmly confined by a threaded extension, which receives a nut, $C^5$. By turning the nut $C^5$ the part $C^4$ impinges against the rod $C^2$ and tends to hold the frame stationary. The effect is to move the casting C, and consequently the entire printing mechanism, endwise on the framing A by turning the hand-wheel $C^3$ one way or the other whenever the pinching-nut $C^4$ is slackened. When the printing mechanism is thus moved to the right position it is held very solidly in place by turning the hand-wheel C⁷.

The entire printing mechanism is operated by a single eccentric, D, which is mounted on the main shaft B, with liberty for the latter to play endwise through it whenever the pinching-screw $d$ is slackened. This screw $d$ engages the eccentric D firmly with the shaft whenever it is set up tightly. There is preferably a spline longitudinal of the shaft B, to receive the screw $d$, or any suitable shoe serving as a key.

The members of the mechanism for effecting the cutting off of the tags and the punching and eyeleting are mounted in the stout press-frame $A^2$, and will be described farther on.

On an overhung end of the main shaft B are pulleys $B^6$, which, by means of a belt or pitch-chain, E, turn the pulleys $E'$, fixed on the sleeve $E^2$, which latter is supported in fixed bearings on a bracket, $A^3$, which latter, with another bracket, $A^4$, serve as supports for a set of feed-rolls, $E^5 E^6$, which are urged together by loaded cords $E^7$, and receive the paper $m$ and carry it through between them continuously. The motion is communicated through a small pulley, $E^3$, carried on the sleeve $E^2$. This pulley works frictionally on a large face-wheel, $E^4$, fixed on an overhung end of the roll $E^6$. The surface of the small roll $E^3$ is of rubber or analogous material adapted to produce a reliable friction on the wheel $E^4$, and thus to induce a continuous rotary motion of the lower feed-roll, $E^6$, and by friction to operate the upper feed-roll, $E^5$. The conditions allow for varying the rate of motion of the feed-rolls $E^5 E^6$ relatively to the shaft B by shifting the small pulley $E^3$ axially on its sleeve $E^2$. This motion is effected by aid of a hand-wheel, $E^9$, which is fixed on a longitudinal screw, $E^8$, mounted within the sleeve $E^2$. The sleeve is slotted, as shown. There is a segment-nut in its interior, connecting with the wheel $E^3$ through the slot. The screw $E^8$ is held between collars near the hand-wheel $E^9$. This ordinarily turns with the sleeve $E^2$; but when it is desired to change the velocity of the feed-rolls $E^5 E^6$ it is simply necessary to turn the hand-wheel $E^9$ in one direction or the other, thereby, through the screw $E^8$, moving the small wheel $E^3$ endwise on its sleeve and causing it to act on the face-wheel $E^4$ at a greater or less distance from its center.

$E^{10} E^{11}$ are simple pinching-rolls, not turned except by the motion of the paper $m$. They are urged together with a gentle force by means of the loaded cords $E^{12}$. The paper is drawn forward intermittently through the rolls $E^{10} E^{11}$. The latter exert a friction which tends to keep the paper tight.

$E^{13}$ is a loose roller of metal or other heavy material. It lies in the depressed bight of the paper $m$, between the constantly-turning rolls $E^5 E^6$ and the intermittently-turning rolls $E^{10} E^{11}$. The roll $E^{13}$ is alternately raised and lowered as the machine works.

$C^6$ is the stationary platen of my printing mechanism. It is mounted on a stout casting, which is bolted to press-frame C, and also clamped to bed A. This is adjustable with press when the nut is loosed underneath. When the casting C is adjusted endwise on the frame A the platen $C^6$ is moved therewith, or must be adjusted thereto before the machine is worked. It may be covered with blankets and paper in the ordinary manner.

F is the movable type-bed. It is connected by arms $F'$ to an axis, $F^2$, fixed in the casting C.

$F^3 F^4$ are respectively the parts of a stout toggle through which the force of the impression is communicated by means of a connection, $F^5$, forming an extension from an eccentric ring, $F^6$, which embraces and is turned by the eccentric D.

$F^7$ is an arm rigidly fixed on the part $F^3$ of the toggle. It takes hold of arms G, which are keyed on the overhung ends of a rocking shaft, $G'$, which is supported in the casting C.

$G^2 G^2$ are slide-rods mounted in bearings in the arms G, and free to move endwise—that is to say, radially to the shaft $G'$. To their outer ends are pivoted tilting bars $G^3$, carrying rolls $G^4$, of soft and elastic composition, to serve as inking-rollers. A long spiral spring, $G^5$, incloses each rod $G^2$ and exerts a lifting force on the rollers $G^4$. After each impression by the type-bed F on the platen $C^6$ to print a portion of the paper $m$, the inking-rolls $G^4$ are traversed backward and forward across the form.

$G^6$ is an inking-table mounted on a central shaft or pivot in the position represented. The inking-rollers $G^4$ traverse across it at each reciprocation. The inking-table is partially turned by a lever and click, after each visit of the inking-rolls, by automatic means, which may be of any ordinary or suitable character. The intermittent feed of the paper is induced by mechanism which is adapted to serve also as rotary shears to trim the edges. Provision is made for varying the extent of the feed with great nicety.

$B^7$, Figs. 1, 2, and 6, is a gear-wheel fixed on the shaft B. It engages with a gear-wheel, H, turning freely on a fixed stud. (Not represented.) $H'$ is a face-plate screwed firmly on the front of the wheel H. A screw, $H^2$, lies in a slot extending radially across the face of the plate $H'$. The slot is of T section. A nut of corresponding section is controlled by the screw so as to be held at the required distance from the center and give the desired throw to the attached crank-pin $H^3$. This operates a pitman, $H^4$, which connects by a pin, $H^5$, with a vertically-sliding rack, $H^6$, which is guided in ways fixed on the press-frame $A^2$. This rack $H^6$ engages with a pinion, $H^7$, on the short horizontal shaft supported in a fixed bearing, $A^5$. On the other end of said shaft is a gear-wheel, $H^8$. This engages with the horizontal rack $H^9$, which, as the crank $H^3$ turns, is reciprocated backward and forward. The extent of the motion may be varied by turning the screw $H^2$ to shift the crank-pin $H^3$ to or from the center. When the right position is found the crank-pin H³ is set solidly in place by tightening the nut thereon. The rack H⁹, reciprocating longitudinally of the machine, gives a corresponding alternate rotation in opposite directions to a pinion, H¹⁰, fixed on the sleeve H¹¹, loosely held on the turning shaft I'. The sleeve H¹¹ is formed with a socket, as shown in Fig. 8, which receives the inner end of a pawl or click, H¹³, actuated by a spring, H¹⁴, which holds its outer end gently in contact with the inner toothed face of a wheel, I, and communicates to it, instead of a motion alternately in opposite directions, an intermittent motion always in the same direction, the wheel standing idly while the sleeve H¹¹ turns the opposite way.

The internally-toothed wheel is marked I. It is fixed on the shaft I', which is mounted in bearings in a housing, A⁶. The shaft I' carries adjustable devices I² I³, which may, by adjusting the pinching-screw shown, be set farther apart or nearer together on the shaft I' at will. Each of the devices I² I³ is adapted to serve the two functions of a pinching-roller to pinch and move forward the paper and of one-half of a shear to trim the edge.

I⁴ is a corresponding shaft mounted above. It is equipped with devices I⁵, which are counterparts of the devices I² I³ below, and are similarly capable of being adjusted on their shaft I⁴ to the proper distances apart. The rolling portions I² I⁵ of these devices roll together, and by pinching the paper feed it reliably forward at each of the intermittent movements. The shearing-projection I³ works against the corner or edge of the roll I⁵, which must be of proper material and sharply ground, to serve as a counterpart to the shear I³ and trim off the surplus paper. As the wheel I is turned intermittently by the mechanism described the shafts I' I⁴ are correspondingly turned and the paper is fed forward intermittently, and all that projects beyond the shearing-line each side is sheared off and allowed to fall.

I⁷ is a bearing block, hollowed on its under face and resting on the middle of the shaft I⁴. It is pressed down by a screw, I⁸, tapped through the cross-beam of the housing A⁶. This arrangement allows the rollers or rolling portions I² I⁵ to be pressed together with adjustable force. It also insures that these rolls shall bear equally under all circumstances. There is a gentle spring (not shown) acting under each end of the upper shaft, I⁴, to elevate it. To introduce or remove the paper the screw I⁸ may be relaxed, and the springs will slightly hoist the upper shaft.

The entire housing A⁶ and its contained devices may be shifted forward and backward on the frame A by slacking the screw I⁹; but such adjustment is not usually required.

The paper fed forward intermittently by the action of the mechanism described is restrained by the rollers E¹⁰ E¹¹, so as to be kept at a moderate tension. After each impression from the form in the bed F the turning of the shafts I' I⁴ draws forward the paper $m$ sufficiently to remove the impression already printed and present a portion of the paper $m$ to receive the next impression, and so on.

J is a slide guided in upright ways in the stout goose-neck A², and reciprocated up and down by means of a toggle, K, worked by a connection, K', from the eccentric-ring K², which embraces and is turned by the eccentric D, secured on the main shaft B. The slide J performs important functions. On its lower projecting end it is spread out in a broad head, J', which holds a transverse knife or cutter, J², and also certain punches or analogous devices, J³ J⁴. The device J³ is a punch proper. Its function is at each depression of the slide J to punch a hole in the paper presented thereto. It will be understood that there is a corresponding recess in a hard-steel die properly presented below, so that the hole can be punched clean and smooth. The function of the knife or cutter J² is to divide the paper $m$ on a line directly across the strip. The function of the device J⁴ is to form a suitable abutment on the upper face, against which an eyelet which has been supplied by other means in the hole last punched shall be clinched or set by a device coming up from below.

The main body of the eyelet-clinching device is marked L. (See Figs. 10, 11, and 19.) It carries a removable die, L', of hardened steel, properly shaped to act on the eyelet. Through a hole in its interior plays a pin, L², having a head, L³, and actuated by a spring, L⁴, which abuts against a screw, L⁵, near the lower end of L. The extreme lower end of L is provided with a stout wheel, L⁶, turning on a pin or pivot, L⁷. The device L is actuated by a shaft, M, on which is fitted a sprocket-wheel, M', receiving motion through a pitch-chain, N, from a sprocket-wheel, B⁸, on the end of the main shaft B. The shaft M is supported in stout brackets A⁷. M² is a cam fixed on the shaft M, and properly formed to give the required motion to the device L at the proper times. A spring (not shown) may be introduced to aid the sinking of the device L. The eyelets are introduced in quantities in an eyelet-reservoir, O, which is provided with a removable cover, O', and is mounted on the lever O², vibrating on an adjustable pin, which is changed in position when required to treat a tag of different size. A spout, O³, mounted on the same lever, is properly formed to receive the eyelets from the reservoir O whenever they are presented at the upper end of the spout in the proper position. The agitation to which the eyelets are subjected causes the mass to be presented in every possible relation, and the result is a stream of eyelets following each other easily down the spout O³. The lower end of the spout O³ is equipped with a spring, O⁴, which in my experiments has been a small bit of rubber, but which might be a spring of hard brass, steel, or any other suitable material. Its function is to arrest the lowermost eyelet, but to hold it in such a manner that when acted on by any sufficient force it can be delivered by the yielding of the spring.

Fig. 18 shows two rubber springs, one on each side. I prefer to so work them. It will be understood that they should project a little into the path of the eyelets.

Figs. 14 and 18 show provisions which I prefer to employ for facilitating the entrance of the eyelets in their proper positions into the channel $O^3$. This part of the mechanism has been long known and approved in machines for setting eyelets in corsets. The result is to insure a sufficient supply of eyelets pressing after each other down the spout $O^3$.

The proper movement of the eyelet-reservoir and its connections is obtained from the slide J through a rocking shaft, P, mounted in fixed bearings $A^8$. A pin, $J^5$, screwed in the back face of the slide J, is received in the forked end of the arm or lever $P'$, keyed on the shaft P. The other end of the same shaft carries a rigid arm, $P^2$. As the slide J moves down, influenced by the strong toggle K, it acts through the arm $P^2$ on the lever $O^5$ (see Figs. 14 and 15) and lifts the eyelet-reservoir O and its connections. This moves the eyelet-spout $O^3$ out of the way, leaving the eyelet which was previously in the front end of the spout impaled on the spring-pin $L^2$, which has in the meantime been protruded upward from below. The further sinking of the slide J brings the eyelet-clinching device $J^4$ into action and the eyelet is properly set between the devices $J^4$ and $L'$. Nothing remains now but to remove the finished tag. I provide what I term a "knock-off" to effect this.

Q is the knock-off lever, Figs. 10, 11, 12, 13. It vibrates on a fixed pin, $Q'$, set in a portion of the fixed frame-work A. One end, $Q^2$, is acted on by a lever, R, vibrating on a center, $r$, and actuated by a crank-pin, $M^3$, on the end of the shaft M. At each operation of the machine the crank-pin $M^3$ turns the lever R slowly until it arrives at the position shown in dotted lines in Fig. 13, and then liberates it suddenly. The other end of the lever Q is subject to the action of a spring, $R'$. The moment the crank-pin $M^3$ liberates the lever R the spring $R'$ brings the parts quickly back to their original position. The motion is arrested by the aid of an elastic stop, S, of india-rubber, mounted on a fixed pin, $S'$. When the parts return smartly to their original position under the influence of the spring $R'$ the lever Q strikes the elastic stop S, and by slightly compressing it moves a little beyond its normal position. This latter is the movement which knocks out the finished tag.

T is the knock-off slide, fitted to move easily in a groove in the top of the fixed frame-work, subject to the action of the lever Q and spring $R'$. Its working-edge is thickened, as shown in Fig. 13. The lever Q takes hold of it through the medium of an adjustable piece, $T'$, which is held by a screw, $T^2$. This piece $T'$, by slacking the screw $T^2$ and tightening it again, allows the knocker T to be shifted forward or backward relatively to $T'$, and consequently to the knock-off lever Q and to the operating-spring and stop. This allows the device to treat tags of various sizes.

It will be understood that in adjusting the machinery to make tags of any required size a strip of paper, $m$, is introduced of a size exactly that required, or preferably a little in excess. This may be supplied from any suitable spool, roller, or other device. (Not represented.) This is drawn off from the roller or out of the basket or other reservoir at the average rate required by a constant turning of the rolls $E^5$ $E^6$, the motion of which is regulated properly, as above explained. For a while the paper accumulates between the rolls $E^5$ $E^6$ and $E^{10}$ $E^{11}$, being drawn down by the sinking of the roll $E^{13}$. Presently the intermittent rolls $I^2$ $I^5$ commence to draw forward the material, and the paper $m$ is moved forward in the machine. This moving forward is effected while the printing-bed F is up, and while the slide J and its attached shear $J^2$, punch $J^3$, and eyelet-setting device $J^4$ are also up. When the intermittent feed-rolls $I^2$ $I^5$ cease to move, the paper $m$ comes to rest both in the printing mechanism and in the cutting and punching mechanism.

The action of the printing devices is obvious.

The action of the mechanism for the punching, cutting off, &c., will bear repeating. Each depression of the slide J finds the paper fed forward. The last operation sheared off the paper by the cutter $J^2$. It also punched a hole in the main body of the paper by the punch $J^3$. Now that the paper has fed forward, the hole last punched has been carried past the cutter $J^2$ and is presented directly in line of the eyelet-setting devices. The eyelet-spout $O^3$ is now lowered into position and presents an eyelet directly over the point where it is wanted. Next the eyelet-setting device L is raised, and its slender spring-pin $L^2$ is thrust up through the center of the eyelet. In this condition of the parts the slide J commences to descend. Its movement, through the action of the rocking shaft P, draws away the eyelet-spout $O^3$, leaving one eyelet engaged on the pin, ready to be thrust up into the hole in the tag which was punched by the preceding operation. Now the slide J descends and cuts off the tag, and also brings the eyelet-setting abutment $J^4$ into position above the eyelet. Now the eyelet-setter L is further raised by the action of the cam $M^2$, and the eyelet is set. Next the eyelet-setter L is allowed to drop to such a distance as to take the spring-pin $L^2$ entirely out of engagement with the eyelet; and, lastly, the slide J and its attachments having risen to liberate the tag, the piece T comes smartly forward, and, instead of stopping at its normal position close to the edge of the tag, it moves a little farther by the momentary compression of the rubber stop S, and, striking the edge of the tag a smart blow, knocks it forward out of the machine, where it may be received in a basket or any suitable reservoir. (Not shown.)

The adjustment of the massive casting C and its attached printing mechanism has been before described. It is important in adapting the machine to print tags of all sizes without waste. The shearing device $J^2$ cannot be moved. The punch $J^3$ can be set farther away or nearer to the cutter $J^2$ by shifting in a slot in the obvious manner. So, too, the eyelet-setting abutment $J^4$ can be correspondingly adjusted, and requires to be with changes in the size of the tag. These adjustments require no further description. The extent of motion of the intermittent feeding devices $I^2$ $I^5$ having been adjusted properly to feed forward just enough for one tag, it remains to set the printing mechanism to or from the shearing and accompanying parts, so as to print in exactly the right places. In other words, the machine must be so adjusted that the surface which will ultimately become a tag, the fifth or some other number in advance of the one which is being sheared off, shall be printed in the right position.

U is a flexible strip of muslin or other suitable material, attached to the platen $C^6$, and drawn over an idle-roller, $U'$, by the force of a gentle weight, $U^2$.

V is a corresponding strip of muslin or other material, attached to the housing $A^6$, and running over an idle-roller, $V'$, mounted at one edge of the platen $C^6$, it is stretched by a weight, $V^2$. These flexible tables are drawn sufficiently tight by their weights to assume a plane condition of the top and allow for the changes of position of the printing devices, while the provision is maintained for holding the paper $m$ steadily up to a plane condition.

I prefer in practice to work the intermittent rolls $I^2$ $I^5$ nearer to the punch and shearing devices, so there is no need of any table in the small space between. A suitable rigid or flexible table can be introduced there, if desired.

Modifications may be made in the forms and proportions of many of the details. Parts of the machinery may be used without the others. Some of the parts may be duplicated.

I propose in making small tags to duplicate or triplicate the shearing and the punching and eyelet-setting devices, and to provide rotary shears on the shafts $I'$ $I^4$, so as in printing small tags to punch, divide, and set eyelets in two or other number of tags at one operation.

I propose to provide a griper or clamp which shall press upon the paper near the shear $J^2$ to hold it firmly. It shall, of course, be raised when the paper is to feed forward.

I propose, in cases where the expense will be warranted, to apply two or more sets of printing mechanisms, each of which may be formed and arranged exactly as shown by the casting C and its contained and connected parts. A different type-form being held in the proper type-bed and a different-colored ink being applied, I can print two colors.

I propose to elongate the bed and insert as many such printing devices as may be required, each printing a different color.

In preparing coupon-tickets for railroads, theaters, and the like, I can introduce prick-wheels, against corresponding rollers having holes in them, or working against rubber-faced rollers, to produce proper lines of punctures on the material to facilitate its separation along certain lines, as is well understood.

I can use any of the artificial or suitable devices for numbering in combination with my mechanism, so as to number the tickets or tags consecutively or otherwise, as required.

What I have termed the "paper," $m$, may be thick or thin paper, or cardboard, bristol-board, artificial parchment, muslin, or other material adapted to be fed through and treated in the manner I have described.

The machine may be built in various sizes; but I consider it best adapted for small work, such as tickets and labels, in one or more colors, and tags to be fastened onto various articles of manufacture.

I claim as my invention—

1. The intermittent feeding and edge-shearing mechanism $I^2$, $I^3$, and $I^5$, suitably mounted and operated, in combination with the reciprocating shearing means $J^2$ and punch $J^3$, substantially as set forth.

2. The eyelet-setting device L $L'$ and cam $M^2$, in combination with each other, and with the spring-pin $L^2$ $L^3$ and spring $L^4$, located in device L, and with the movable setter $J^4$, substantially as herein specified.

3. The eyelet-reservoir O and spout $O^3$, hung on the lever $O^2$ $O^5$, in combination with the levers $P'$ $P^2$, operated by the pin $J^5$ on the slide J, and with the eyelet-setting means L and abutment $J^4$, as herein specified.

4. The knock-off device T, connected adjustably to the slide $T'$, carried by the knock-off lever Q, in combination with each other, and with means for operating it smartly at the proper time, and with a yielding spring, S, allowing the knock-off to strike a little beyond its normal position, so as to remove the tag by a sudden blow, as specified.

5. The flexible tables U V, in combination with the fixed feeding and adjustable printing mechanisms, as herein specified.

6. In combination with mechanism for printing and cutting off tags and analogous articles, the constant-feed rollers $E^5$ $E^6$, having an adjustable rate of motion through the frictional contact of the adjustable roll $E^3$ on the plate $E^4$, and the intermittent feed-rollers $I^2$ $I^5$, tension-rollers $E^{10}$ $E^{11}$, and means, $E^{13}$, for taking up the slack, as herein specified.

THOMAS A. BRIGGS.

Witnesses:
WILLIAM G. BUDLORY,
WARREN R. PERCE.